Figure 1:
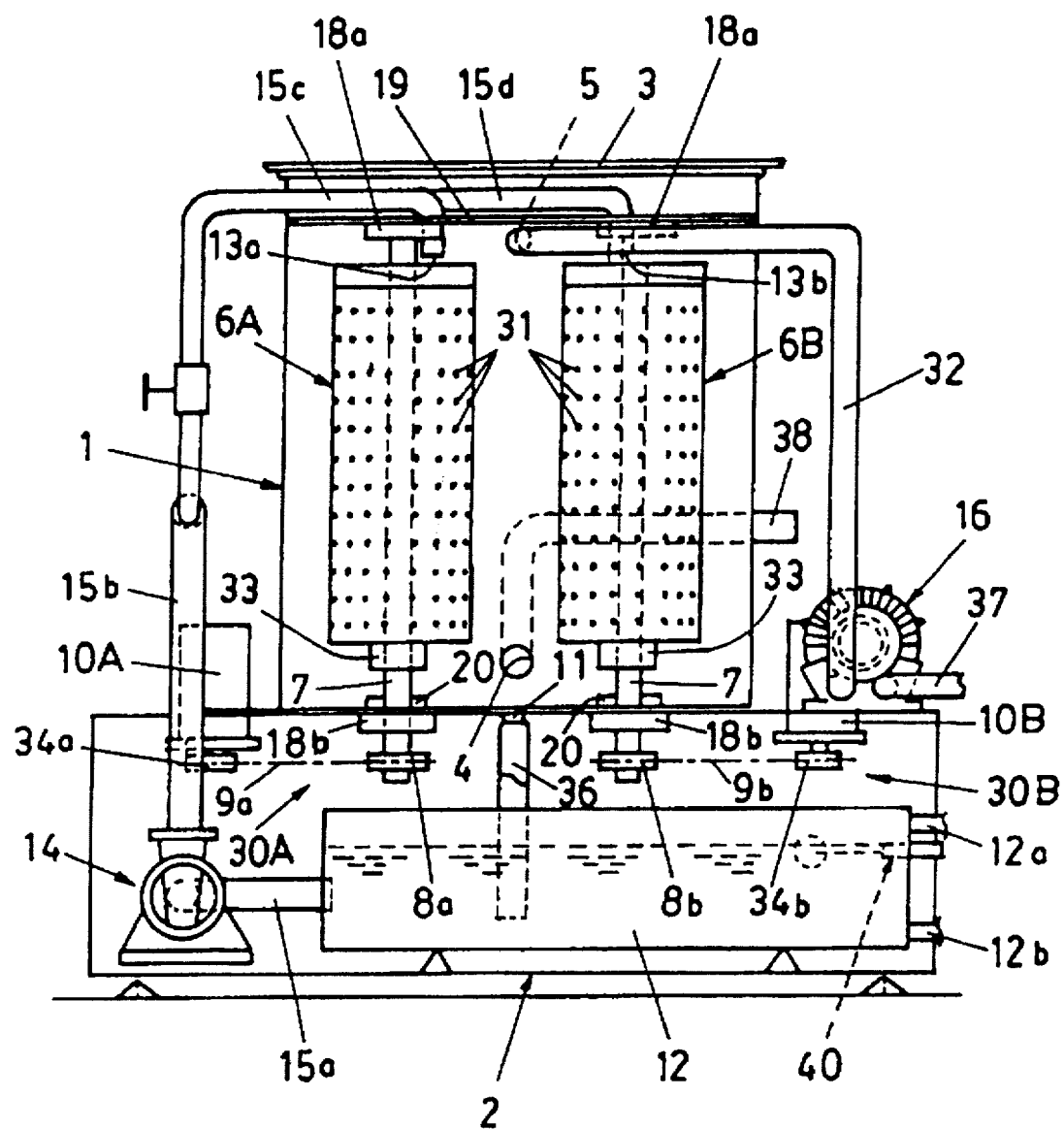

United States Patent [19]

Takagi

[11] Patent Number: 5,704,954
[45] Date of Patent: Jan. 6, 1998

[54] AIR PURIFICATION APPARATUS

[76] Inventor: Hideaki Takagi, 1-13-9, Aogein, Minohshi, Osaka, 562, Japan

[21] Appl. No.: 595,977

[22] Filed: Feb. 6, 1996

[30] Foreign Application Priority Data

Aug. 11, 1995 [JP] Japan ................... 7-206312
Nov. 10, 1995 [JP] Japan ................... 7-292272

[51] Int. Cl.$^6$ ........................................ B01D 47/08
[52] U.S. Cl. ........................ 55/230; 96/27; 261/89
[58] Field of Search ................ 55/230, 231; 96/17, 96/27; 261/89, 88, 90

[56] References Cited

U.S. PATENT DOCUMENTS

| 1,749,260 | 3/1930 | Pretot et al. | 55/230 X |
| 2,789,866 | 4/1957 | Umbricht | 55/230 X |
| 3,421,485 | 1/1969 | Fessenden | 261/89 X |
| 4,138,858 | 2/1979 | Izumi | 62/309 |
| 4,294,781 | 10/1981 | Holmquist | 55/230 X |
| 4,501,121 | 2/1985 | Izumi | 62/78 |
| 4,501,130 | 2/1985 | Izumi | 62/304 X |
| 4,622,077 | 11/1986 | Izumi | 134/36 |
| 4,692,283 | 9/1987 | Wem et al. | 261/89 |
| 5,099,770 | 3/1992 | Yang | 55/230 X |

FOREIGN PATENT DOCUMENTS

| 1053473 | 5/1979 | Canada. | |
| 1227530 | 7/1982 | Canada. | |
| 1227401 | 9/1987 | Canada. | |
| 523623 | 4/1921 | France | 261/89 |
| 136685 | 2/1960 | U.S.S.R. | 55/230 |

*Primary Examiner*—Richard L. Chiesa
*Attorney, Agent, or Firm*—Crutsinger & Booth

[57] ABSTRACT

The air purification apparatus includes a waterproof chamber having a water supply inlet, a drain, an air inlet, and an air outlet. At least two cylinders are mounted to spin about their respective axes within the chamber in parallel alignment adjacent to each other, and a motor drives each of the cylinders to rotate at high speed. The surfaces of the cylinders have numerous small holes formed therein. A pump circulates water through the water supply inlet to the inside of each of the cylinders. By rotating the cylinders at high speed, the water pumped to the inside of each of the cylinders is injected by centrifugal force through the numerous small holes therein at high speed such that streams of water droplets are forced to collide against each in the typhoon chamber and particularly between the cylinders. These forceful collisions produce infinitesimally small water particles with negative ions that have high air purification ability. An air blower circulates air through the chamber for purification.

21 Claims, 8 Drawing Sheets

AIR PURIFICATION APPARATUS

FIELD OF THE INVENTION

This invention relates to an air purification apparatus and method for removing air pollutants such as smoke, odors, pollen, and dust from the air of an indoor room.

BACKGROUND OF THE INVENTION

In general, an indoor room, such as an office, conference room, meeting hall, restaurant, or a game center where many people gather is kept relatively air tight to increase heating or air conditioning efficiency. But without an exchange of substantial indoor air volume with fresh outside air, the air inside the room becomes increasingly polluted with the passage of time.

The problem can be particularly acute when people are smoking. Due to these indoor environmental concerns, some indoor businesses, such as restaurants, meeting halls, and game centers set aside "no smoking" sections or prohibit smoking altogether. While this step is appreciated by non-smokers, it is often not appreciated by smokers. Furthermore, while smoking is probably one of the strongest sources of indoor odor and pollutants, there are many other sources, including for example, cooking odors and the out-gassing of fumes and solvents from paints, glues, floor carpeting, and other building materials. Thus, it would be highly desirable to provide an indoor air purification apparatus and method that is capable of reducing typical indoor air pollutants, especially if effective to reduce pollutants caused by smoking.

As a more positive air purification measure than simply banning smoking, air conditioning equipment can be installed that has an electric filter to mechanically remove smoke and dust particulates and purify the air. This type of an air purification apparatus relies on drawing polluted air of a room through a filter and then recirculating the filtered air back into the room. But the air recirculation rate is often inadequate to provide the desired environmental comfort and removal of pollutants, especially when people are smoking, such that a substantial amount of relatively polluted air remains in the room. Therefore, many people continue to experience discomfort and are exposed to unhealthy conditions for extended periods. Furthermore, because this type of an air purifying filter operates by absorbing the pollutants, as it absorbs pollutants it tends to lose purifying power so that the filter must be frequently cleaned or changed. It is not only inconvenient to operate, but also is expensive to maintain, inspect, and change the filter so often. Thus, these air filter systems are often not adequately maintained to provide desirable indoor air quality conditions.

It is known that in nature, as water falls and cascades to collide against rocks, a fine spray of water can be created, which includes small water particles having negative ions in abundance. These water particles having negatively charged ions have the effect of purifying the atmosphere. This is called as "the Lenard effect" discovered early in the twentieth century of Dr. P. Lenard, the Nobel prize winner in physics, or it is sometimes referred to as a "waterfall effect."

Also, it is known as a law of nature that the power of a typhoon or heavy rain storm forces rain drops to collide against each other repeatedly, so that as splitting and fragmentation of water drops further progresses, it produces ultra infinitesimally small water particles and negative ions covering large area in abundance and purifies the atmosphere completely. These ultra infinitesimally small water particles can be produced more effectively, more finely, and more voluminously than the water particles produced by the "waterfall effect." For example, the observation data of the Kobe Marine Weather Station for typhoon Number 13, as it passed through at 7:00 a.m. on Sep. 4, 1993 shows ultra infinitesimally small water particles with ions smaller than 0.1 micron ($\frac{1}{10,000}$ millimeter), the water particles having positive ions measured at 10,240/cc and negative ions of 141,058/cc (where "cc" is one cubic centimeter). Thus, a "typhoon effect" generates many more negative ions than positive ions on the water particles. With the passage of a typhoon and time, the amount of both water particles with positive ions and with negative ions is decreased and the observation data at 3:00 p.m. on same day shows almost balanced amount of water particles with positive ions of 2,483/cc against negative ions of 2,574/cc.

In contrast, an office equipped with air conditioning in a typical big city has particles with positive ions of 200–300/cc against negative ions of 50–100/cc. In other words, in a typical indoor office environment, there are usually more positive ions than negative ions.

Recently, the fact that negative ions exercise strong air purification power has begun to attract attention, and the research to produce negative ions artificially and applying to air purification technology has been advanced. For example, a negative ion generating device utilizing the "waterfall effect" has been devised, which employs the injection of high pressured water through numerous small nozzles of fine diameter against an inside wall of a metal tank to produce some negative ions upon impact. (See U.S. Pat. No. 4,622,077 issued to Masahiko Isumi on Nov. 11, 1986 entitled "Method of Cleaning Inside of Room"; and Japanese Official Publication Ref. No. TOKU-KO HEI 3-76,994.) However, the nozzle device requires numerous injection nozzles within a tank and also must have a very powerful water pump for forcing water at high pressures through the nozzles. These require a complex structure and high manufacturing cost. Furthermore, the artificial "waterfall effect" created is not as strong as the "typhoon effect," and does not produce such ultra infinitesimally small water particles nor so many negative ions.

Another example is an electronic device for producing both ozone and negatively charged ions by applying corona discharge has been developed. However, this type of electronic device utilizing a corona discharge also produces ozone, which is a health hazard. Furthermore, while corona discharge can produce negative ions in abundance, for some unknown reason the ions produced by this method are relatively short lived and do not remain long in the air, as compared with negative ions created by either the waterfall effect or the typhoon effect.

Accordingly, it is an object of the invention is to provide an air purification apparatus and method that can be manufactured at economical price with simple structure and that does not produce hazardous ozone.

SUMMARY OF THE INVENTION

According to the invention, an air purification apparatus is provided. The apparatus includes a typhoon chamber of waterproof structure having a water supply inlet opening, a drain, and air inlet and outlet openings. A plurality of spinning cylinder assemblies mounted within the typhoon chamber in parallel alignment to each other, and the surface of each of the spinning cylinder assemblies having numerous small holes formed therein. A motor is operatively connected to each of said spinning cylinder assemblies to each of said plurality of spinning cylinder assemblies at high speed. A water pump is operatively connected between a water tank and the spinning cylinder assemblies for pumping water from the water tank to the plurality of spinning cylinder assemblies in the typhoon chamber. An air blower is operatively connected through a duct to at least one of the air inlet and outlet openings of the typhoon chamber for circulating air through said typhoon chamber. By operating the motor to rotate the plurality of spinning cylinders at high speed, and by pumping water from the water tank to the plurality of spinning cylinders, water pumped to the inside of each of the plurality of spinning cylinders is injected by centrifugal force through the numerous small holes therein at high speed such that water drops are forced to forcefully collide against each other. These forceful collisions produce infinitesimally small water particles and negative ions that have high air purification ability. These are delivered in abundance by the air blower through to a remote location outside the apparatus where air purification is needed.

By rotation of the plurality of spinning cylinders at high speed, water inside of a spinning cylinder assemblies is injected through numerous holes at high speed. Water drops collide head on against each other in the space between the spinning cylinder assemblies and at the same time fine water particles also collide repeatedly with each other by violent turbulent air. The water particles shatter each other, splitting and fragmenting into smaller and smaller water particles until ultra infinitesimally small water particles, negative ions (having a diameter of 0.5 micron and under), and gaseous water molecules are produced in abundance with high density. These are then delivered to the place requiring air purification and purify floating smoke, odor, dust, mold, and bacterium there.

Since the factor if air pollution—smoke, odor, dust, mold, and bacterium—seems to be ionized positively and floating in the air, ultra infinitesimal water particles and negative ions or water molecules with negative ions are easily and directly combined with them. As a result of the combination, the weight of the combined mass is increased and it drops to the floor. Or the lightweight combined mass which keeps floating harmlessly is returned to the apparatus through an air inlet opening and is directly and effectively purified by ultra infinitesimal water particles and negative ions produced in abundance with high density, inside of a typhoon case and delivered again by an air blower device to the place requiring air purification. By repeating this circulation, air is purified until it becomes odorless and harmless.

These and other advantages and features of the invention will be apparent upon reading the following detailed description of presently preferred embodiments of the invention.

BRIEF DESCRIPTION OF THE DRAWING

The drawings together with the written description serve to explain the principles of the invention. The drawings are only for purposes of illustrating preferred or alternate examples of how the invention can be made and used and are not to be construed as limiting the invention to only the illustrated and described examples. The various advantages and features of the present invention will be apparent from a consideration of the drawings in which:

FIG. 1 is a cross-sectional side view illustrating the structure of an air purifying apparatus according to a presently preferred embodiment of the invention;

FIG. 2 is a top plan view of the air purification apparatus illustrated in FIG. 1;

FIG. 3 is an end view with partial cut-away of the apparatus shown in FIG. 1;

FIG. 4 is a top view of one of the spinning cylinder assemblies shown in FIGS. 1 and 2;

FIG. 5 is a side view of one of the spinning cylinder assemblies shown in FIGS. 1 and 2;

FIG. 6 is an outline diagram illustrating various head on collision points, represented by "x" marks, of water expelled from the small holes of the spinning cylinder assemblies;

FIG. 7 is an outline diagram illustrating various head on collision points, represented by "x" marks, of water expelled from the small holes of the spinning cylinder assemblies in a second embodiment of an air purification apparatus that has three such cylinders arranged in a row;

FIG. 8 is an outline diagram illustrating various head on collision points, represented by "x" marks, of water expelled from the small holes of the spinning cylinder assemblies in a third embodiment of an air purification apparatus that has three such cylinders arranged in a triangular configuration;

FIG. 9 is an outline diagram illustrating various head on collision points, represented by "x" marks, of water expelled from the small holes of the spinning cylinder assemblies in a fourth embodiment of an air purification apparatus that has four such cylinders arranged in a square configuration;

FIG. 10 is an outline diagram illustrating various head on collision points, represented by "x" marks, of water expelled from the small holes of the spinning cylinder assemblies in a fifth embodiment of an air purification apparatus that has five such cylinders arranged in a staggered configuration;

FIG. 11 is an outline diagram illustrating various head on collision points, represented by "x" marks, of water expelled from the small holes of the spinning cylinder assemblies in a sixth embodiment of an air purification apparatus that has six such cylinders arranged in a rectangular configuration;

FIG. 12 is a top plan view showing the interior of an alternative embodiment for an air purification apparatus according to the invention having four spinning cylinder assemblies arranged in a square;

FIG. 13 is a cross-sectional side view showing the interior of the air purification apparatus of FIG. 12; and FIG. 14 is another cross-sectional view showing the interior of the air purification apparatus of FIG. 12, which is taken from the other direction of the cross-sectional side view of FIG. 13.

Like reference numerals and characters are employed to designate like parts throughout the various figures of the drawing.

DETAILED DESCRIPTION OF PREFERRED EMBODIMENTS

Referring now to FIG. 1 of the drawing, a presently preferred embodiment of an air purification apparatus according to the invention is shown. This air purification apparatus has a waterproof construction including a typhoon case 1. As will be hereinafter described in detail, the typhoon case 1 provides an enclosure for creating a typhoon effect and for exchanging air through the typhoon case 1. Thus, the air is loaded with ultra infinitesimally small water particles and negative ions.

The typhoon case 1 can be supported by a base 2. As will be hereinafter described in detail, the base 2 preferably provides a housing for the drive assemblies for creating a typhoon effect and the water and air circulating systems of the apparatus.

Referring to FIG. 3 of the drawing, the typhoon case 1 is preferably provided with a top lid 3, the inside of which is sealed all around by a waterproof rubber seal. The lid 3 is equipped with a hinge 3a which allows a top lid 3 to be pivotally opened and closed in the direction indicated by arrow A. The lid 3 is also equipped with a latch 3b which closes a top lid 3 firmly in the position shown by FIG. 3. Thus, the hinged top lid 3 can provide periodic access to the interior of the typhoon case 1 for easy maintenance of the air purification apparatus.

Figure 2:
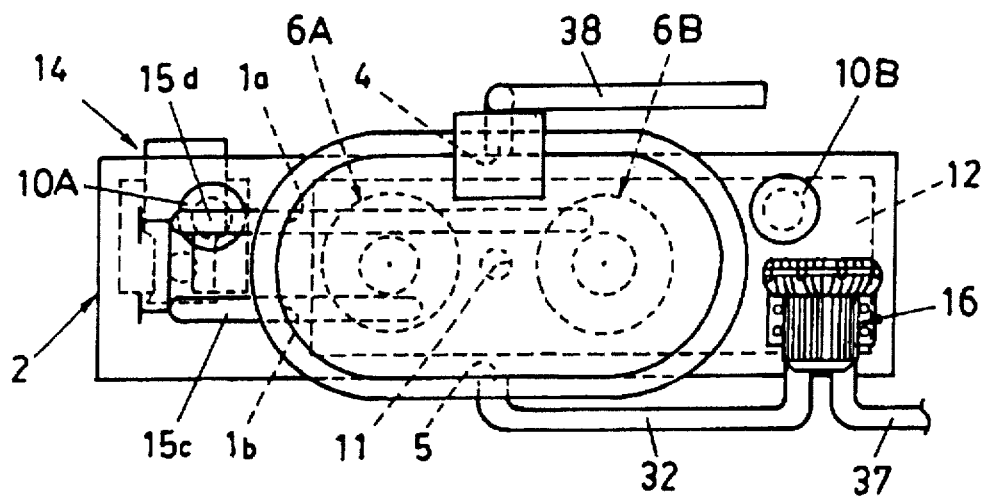

Referring to FIGS. 1 and 2, the typhoon case 1 has at least one water supply pipe opening, such as water supply pipe openings 1a and 1b, and has at least one drain hole 11 at the bottom. The water supply pipe openings 1a and 1b are preferably located near the top of the typhoon case 1. Thereby, as will hereinafter be described in detail, water can be introduced into the typhoon case 1, fall through the case, and then drain from the typhoon case.

Figure 3:
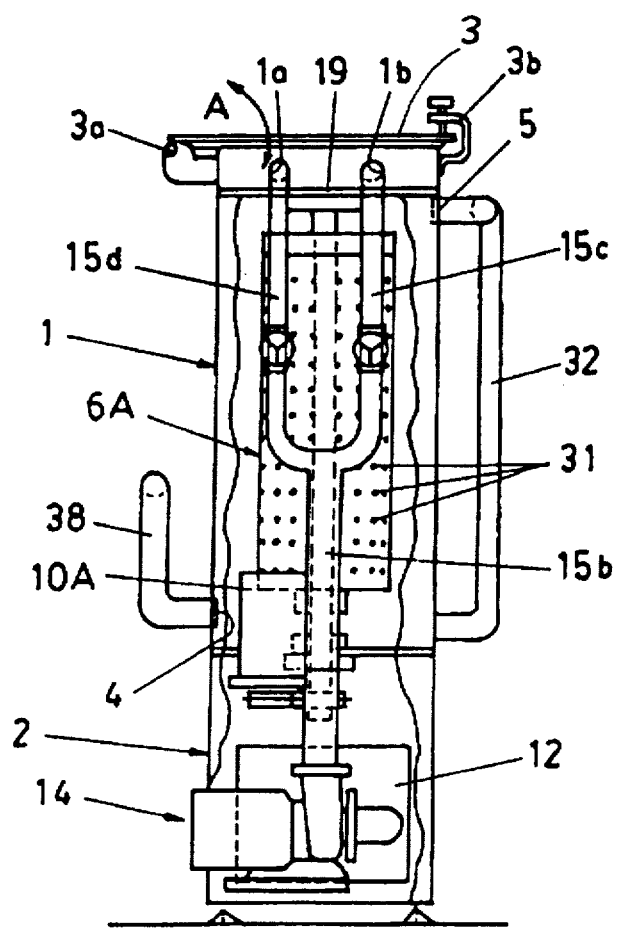

Referring to FIGS. 1, 2, and 3, the typhoon case 1 also has at least one air inlet opening 4 and at least one air outlet opening 5. Preferably, the air inlet opening 4 is located near the bottom of the typhoon case 1, and the air outlet opening 5 is located near the top of the typhoon case 1. Thereby, as will hereinafter be described in detail, air can be introduced into the typhoon case, move generally upward through the case, and then out. Thus, counter movements of water and air within the typhoon case 1 are created in addition to the typhoon effect, which helps the air become loaded with small water particles and negatively charged ions produced by the typhoon effect created within the typhoon case 1.

According to the presently most preferred embodiment of the invention, at least two spinning cylinder assemblies, such as spinning cylinder assemblies 6A and 6B shown in FIG. 1, are used to create a typhoon effect within the typhoon case 1. Each of the spinning cylinder assemblies has an axis of rotation, which can be represented by an imaginary line extending through the center of the cylinder. The axes of rotation of the spinning cylinder assemblies 6A and 6B are preferably spaced relatively close together and preferably aligned to have parallel axes of rotation.

Figure 4:
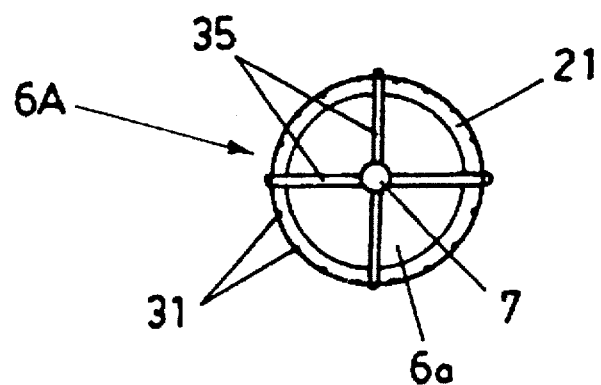
Figure 5:
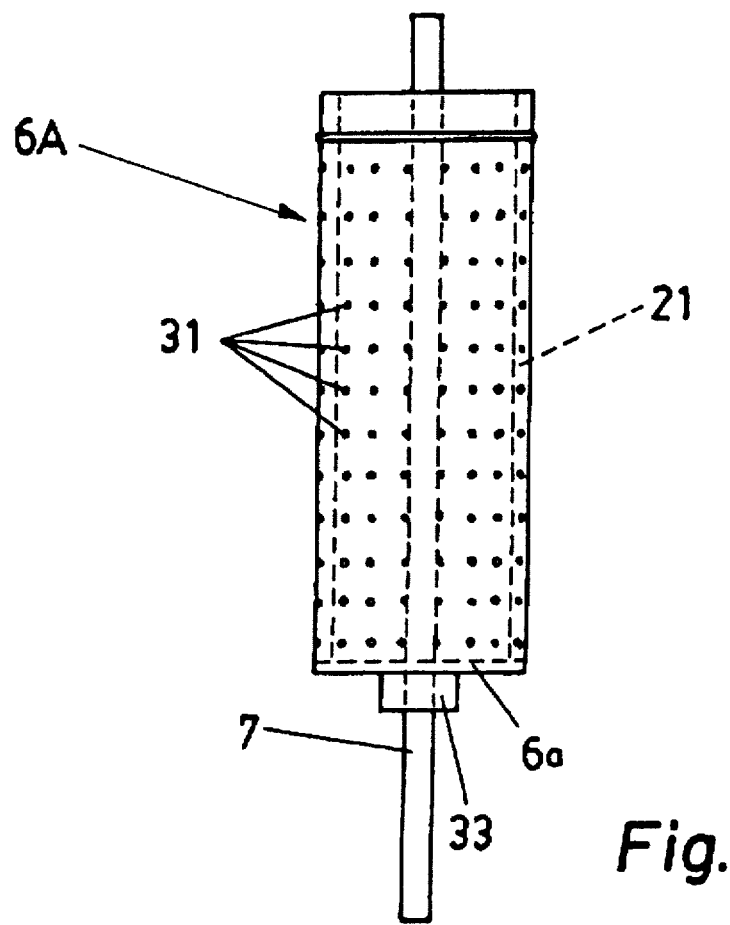

Referring to FIGS. 4 and 5 of the drawing, rotating cylinder assembly 6A is shown in detail, which is representative of the spinning cylinder assemblies 6A and 6B shown in FIG. 1. The rotating cylinder assembly 6A includes a hollow tubular body 6a that is open at the top end thereof and preferably closed at the bottom end. An axis of rotation for the spinning cylinder assembly 6A extends through the center of the hollow tubular body 6a. The walls of the tubular body 6a have numerous small holes 31 formed in the surface thereof. The upper end of the tubular body 6a is supported on a rotation shaft 7 by a plurality of crossmembers 35. The lower end of the tubular body 6a is supported on the rotation shaft 7 by a holding ring 33. The rotation shaft 7 is aligned with the axis of rotation of the spinning cylinder assembly, so that the assembly is centrally balanced about the axis of rotation for spinning at high speed with minimum vibration.

The interior cylindrical wall of the hollow tubular body 6a is most preferably covered with an absorptive material, such as a filter or sponge sheet 21. This sponge sheet 21 absorbs and retains water supplied to a rotating cylinder assembly 6A and also works as a water filter to help remove any pollutants from the circulating water in the typhoon case 1. If desired, small pieces of cut filter material or sponge can be placed inside the spinning cylinder assemblies 6A and 6B to provide additional removal of pollutants from the circulating water. The filter material or sponge also assists in holding water up and against the interior walls of the spinning cylinders, which facilitates the movement of water more evenly through all the holes 31 formed in the surface thereof.

Referring back to FIG. 1, a support bracket 19 is attached firmly to the upper part of a typhoon case 1. Support bracket 19 supports the upper end of the rotation shafts 7 of spinning cylinder assemblies 6A, 6B. The top end of rotation shaft 7 is fixed by a bearing 18a attached to a support bracket 19. The bottom end of rotation shaft 7 is fixed by a bearing 18b attached to the floor of the typhoon case 1. A bottom waterproof seal 20 is attached to a rotation shaft 7 at the bottom of the typhoon case 1 to prevent water from leaking through the seal 20 and out of the typhoon case 1.

As shown in FIG. 1 of the drawing, a drive assembly 30A is provided for rotating cylinder assembly 6A, and a drive assembly 30B is provided for driving rotating cylinder assembly 6B.

Drive assembly 30A includes a motor 10A, a drive pulley 34a, a drive belt 9a, and a transfer pulley 8a. Motor 10A is used to turn the drive pulley 34a. Drive belt 9a is mounted to and stretched between the drive pulley 34a and the transfer pulley 8a, thus, rotation of the drive pulley 34a is transferred to the transfer pulley 8a through the belt 9a. Transfer pulley 8a is connected to the rotation shaft 7 of rotating cylinder assembly 6A.

Similarly, drive assembly 30B includes a motor 10B, a drive pulley 34b, a drive belt 9b, and a transfer pulley 8b. Motor 10B is used to turn the drive pulley 34b. Drive belt 9b is mounted to and stretch between the drive pulley 34b and the transfer pulley 8b, thus, rotation of the drive pulley 34b is transferred to the transfer pulley 8b through the belt 9b. Transfer pulley 8b is connected to the rotation shaft 7 of rotating cylinder assembly 6B.

The motors 10A and 10B are preferably high speed electric motors. Thus, the operation of the motors 10A and 10B is transferred to the spinning cylinder assemblies 6A and 6B. The relative sizes of the drive pulley 34a and the transfer pulley 8a can be selected or adjusted to provide a desired gear ratio between the speed of the motor 10A and the speed of rotation of the rotating cylinder assembly 6A. Similarly, the relative sizes of the drive pulley 34b and the transfer pulley 8b can be selected or adjusted to provide a desired gear ratio between the speed of the motor 10A and the speed of rotation of the rotating cylinder assembly 6A. If desired, the motors 10A and 10B can be multi-speed motors to provide an alternative or additional means to control the rotational speed transferred to the spinning cylinder assemblies 6A and 6B, respectively. Therefore, the rotational speed of spinning cylinder assemblies 6A and 6B is changeable.

In this preferred embodiment of the invention, the spinning cylinder assemblies 6A and 6B are rotated at high speed by motors 10A and 10B, respectively, and the description is made accordingly. It is to be understood, however, that if desired a single motor can be used to rotate both spinning cylinder assemblies at high speed.

In this operating form of the invention, the rotation speed of the spinning cylinder assemblies 6A and 6B is changeable at three steps, for example, 1,300 rpm, 1,500 rpm, and 1,700 rpm. The different speeds can be achieved with a suitable high speed motor and by using the appropriate combination of drive pulley 34a and transfer pulley 8a between the motor 10A and the rotating shaft 7 of spinning cylinder assembly 6A. The same applies to the motor 10B and the spinning cylinder assembly 6B. Also by applying inverter control, the rotation speed of motor 10A and 10B are variable, and accordingly the rotation speed of spinning cylinder assemblies 6A and 6B can be varied without the above-mentioned changes in pulley sizes to change the gear ratio.

Continuing to refer to FIGS. 1, 2, and 3, the water circulation system of the air purification apparatus includes a water tank 12, a water circulation pump 14, and water supply piping sections 15a, 15b, 15c, and 15d, and a water drain tube 36. The level of water within the water tank 12 is controlled as will hereinafter be described in detail.

The suction side of water circulation pump 14 is in fluid communication with the water tank 12 through water supply piping section 15a. The high pressure side of water circulation pump is connected to water supply piping section 15b, which in turn is connected to forking water supply piping sections 15c and 15d through a "T" connection so that the water flow from the water circulation pump 14 is approximately evenly divided between the two water supply piping sections 15c and 15d. The piping sections 15c and 15d extend into the typhoon case 1 through water supply pipe openings 1b and 1a, respectively. Referring to FIG. 1 of the drawing, the ends of piping sections 15c and 15d that extend into the typhoon case 1 each have a water inlet opening 13a and 13b, respectively, at the end thereof. The water inlet opening 13a is positioned above the rotating cylinder assembly 6A, and the water inlet opening 13b is positioned above the rotating cylinder assembly 6B. Thus, the water circulation pump 14 pumps water from the water tank 12 into the top of the typhoon case 1 and onto the spinning cylinder assemblies 6A and 6B.

The water pumped into the typhoon case 1 through the water inlet openings 13a and 13b falls into the open top of the spinning cylinder assemblies 6A and 6B, respectively. The centrifugal effect created by the high-speed rotation of the spinning cylinder assemblies forces the water to pass through the small holes 31 of the spinning cylinder assemblies 6A and 6B as will hereinafter be described in detail.

After passing through the small holes 31 of the spinning cylinder assemblies 6A and 6B at high speed, the water collides with other droplets and streams of water drops thrown from small holes 31 of the other spinning cylinder assembly or assemblies, which creates the typhoon effect. Some of the water is broken down into infinitesimally small water particles and negative ion charges, which can be loaded into and carried by the air moving through the typhoon case 1 as will hereinafter be described in detail. But some of the water falls to the bottom of the typhoon case 1 toward drain 11. The water is then returned to the water tank 12 through the drain 11 and a drain tube 36, for repeated circulation through the typhoon case by the water circulation system.

The water level in the water tank 12 is controlled by a water level adjusting valve, such as float valve 40, installed within a water tank 12. If the water level in the tank falls below a desired level, the float valve automatically actuates to supply water into the tank from an outside source. If the water level becomes higher than a designated level, excess water is discharged through the overflow discharge pipe 12a.

As the circulating water collects pollutants from air being circulated through the typhoon case 1 of the apparatus, it is expected that the water in the water tank 12 will become increasingly dirty. Thus, periodic maintenance involving purging or cleaning the water tank 12 is indicated, which can be accomplished by draining the water and any accumulated sediment through sediment discharge pipe 12b.

According to the presently most preferred embodiment of the invention, a water tank 12 and a circulation water pump 14 are desirable, however, it is expected that in the alternative, city water can be directly supplied to the spinning cylinder assemblies 6A and 6B through suitable water piping sections and that the drain 11 of the typhoon case can be connected by a water drain pipe to city sewage. While this alternative embodiment of the invention is expected to be functional, it may be unnecessarily wasteful of water resources.

Continuing to refer to FIGS. 1, 2, and 3, the air circulation system of the air purification apparatus includes an air blower 16, a blower suction duct 32, a blower delivery duct 37, and an air collection duct 38. The air blower 16 is provided for drawing air from within the typhoon case 1. The blower suction duct 32 is connected between the air outlet opening 5 of the typhoon case 1 and the suction side of air blower 16. The air delivery duct 37 is connected to the high pressure side of the blower for sending the air from within the typhoon case 1 to a desired location where it is needed in a building. As the air blower 16 draws air from within the typhoon case 1, air is drawn through air collection duct 38 into the typhoon case. The air collection duct 38 is for collecting air from a room or area that needs to be purified. Thus, the air circulation system draws air from a desired location through the typhoon case 1 for purification of the air and to load the air with infinitesimal water particles and negative ions. The cleaner air that is loaded with infinitesimally small water particles and negative ions is then delivered back to a desired location or room.

The operation of the preferred embodiment of the invention described in detail with particular reference to FIG. 1 of the drawing. The water pump 14 pumps water from water tank 12, through water supply piping sections 15a–15d and into the typhoon case 1 and into the spinning cylinder assemblies 6A and 6B. Drive assemblies 30A and 30B rotate the spinning cylinder assemblies 6A and 6B, respectively, at high speed. The water is initially absorbed and retained by the sponge sheet 21 on the interior wall of the spinning cylinder assemblies 6A and 6B (as shown in FIGS. 4 and 5). Referring back to FIG. 1, water supplied to the spinning cylinder assemblies 6A and 6B is subjected to a large centrifugal force, which forces the water through the sponge 21 radially outward and throws the water through the plurality of small holes 31 in the walls of spinning cylinder assemblies 6A and 6B. Thus, the water is practically injected through the holes 31 at high speed. Many of the rotating streams of water drops thrown from the spinning cylinder assemblies 6A and 6B forcefully collide against each other within the typhoon case 1, as diagrammatically illustrated in FIG. 6. These colliding streams of water drops, like the forceful collisions of rain drops in a real typhoon, produce ultra infinitesimally small water particles and negative ions in relatively high density in the air within the typhoon case. These infinitesimal water particles with negative ions have high air purification power. Thus, polluted air delivered within from outside is purified. Furthermore, an air stream including an abundance of ultra infinitesimal water particles and negative ions of less than 0.5 micron size is produced and delivered continuously to the place where air purification is needed by a blower 16 through blower suction duct 32 and air blower delivery duct 37.

The theoretical production mechanism and function of the ultra infinitesimal water particles and negative ions produced by this method is not fully resolved scientifically yet. For example, it is believed that a negative ion produced by high speed collision of water drop is different from a negative ion produced along with ozone ($O_3$) by the application of corona discharge. It is also known that a negative ion produced by the forceful collision of water drops tends to float in the air for a comparatively long time of about 300 seconds (5 minutes). Since the factors of air pollution—smoke, odor, dust, mold, and bacterium—seem to be ionized positively, upon delivery of a negative ion and an ultra infinitesimal water particle in abundance to the place of air pollution these factors of air pollution is directly and easily combined with a negative ion and changed to harmless mass.

As a result of the combination, the weight of the combined mass of a water particle and a smoke or dust particle is heavier, such that the combined mass tends to drop to the floor and out of the air. And the lighter weight combined masses are drawn back through the typhoon case 1 of the air purification apparatus through an air collection duct 38, and being purified again by the abundance of ultra infinitesimal water particles and negative ions, tends to be washed down to the water tank 12 of base 2. Most of the collected pollutant settles down as sediment to the bottom of a water tank 12 and is discharged through a sediment discharge pipe 12b during regular cleaning.

Hereunder, a test result of the actual operation run of this air purification apparatus is described. An air purification apparatus as described herein was operated continuously during the actual business hours at a game hall for the accommodation of 200 persons having a high percentage of smokers. The environmental air of the game hall before operating the air purification apparatus was measured to have 2,000–2,500/cc positive ions, 30–70/cc negative ions, 1,300 ppm $CO_2$; 0.45 mg/m3 dust particles, and a visible haze.

After one day of operation of the air purification apparatus according to the invention, the environment air of the game hall was measured to have 1,270/cc positive ions; 760/cc negative ions; 660 ppm $CO_2$; and 0.16 mg/m3 dust particles, which shows some improvement in air quality.

After the three days of operation of the air purification apparatus according to the invention, the environmental air of the game hall was measured to have 1,760/cc positive ions; 1,250/cc negative ions; 650 ppm $CO_2$; and 0.17 mg/m3 dust particles, and that the haze had disappeared.

The employees who were working all day long reported that eye irritation and discomfort caused by smoking was diminished, that the bad odor that had previously infiltrated their clothes had disappeared, and that the environmental air quality was more comfortable. A janitorial sweeper also commented that dirt on the floor is more visible than before, which can be interpreted as an effect of this apparatus.

As described above, this air purification apparatus does not depend on "water fall effect" theory, which refers to the known phenomenon that some negative ions are produced in the natural world when water of a water fall lands on hard rocks. Instead, the air purification apparatus is based on the "typhoon effect" theory, which refers to the phenomenon that during the much higher energy situation of a typhoon and rain storm, many ultra infinitesimal water particles and negative ions, having a size smaller than 0.5 micron with high air purification power. These infinitesimal water particles and negative ions are produced in the most effective way and in abundance because violent turbulence forces rain water to collide each other forcefully and repeatedly until the nature produces negative ions and the finest water particles in abundance with high density.

And this invention reproduces the above mentioned typhoon phenomena by producing ultra infinitesimal water particles and negative ions in abundance with high density by simple mechanism within a typhoon case 1. This invention makes an air purification apparatus compact and economical by cutting manufacturing cost enormously.

The mechanism (centrifugal water extracting mechanism) adapted for this air purification apparatus to inject water inside of a spinning cylinder assemblies 6A, 6B through small hole 31 at high speed utilizing centrifugal force has been borrowed from a conventional clothes washing machine and it is well known to be a trouble-free, non-breakable, and maintenance free mechanism.

Therefore, as compared with an air purification apparatus that basically produces only negative ions and has been on the market, an air purification apparatus according to the invention has the advantage of higher production efficiency of ultra infinitesimal water particle and negative ions, substantially low manufacturing cost (about 50%), and easy maintenance, repair, and handling by anyone.

FIGS. 6–11

Figure 6:
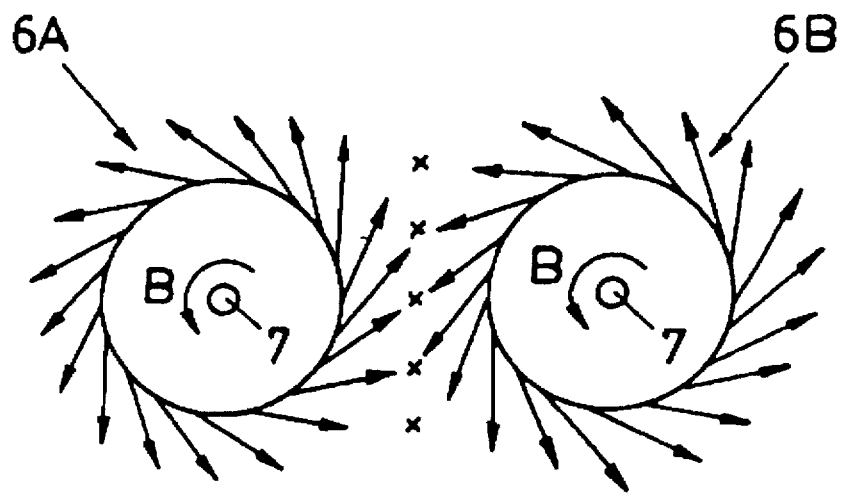

The operating form of this invention described above with reference to FIGS. 1 through 5 provides example of the basic type of the air purification apparatus which produces an ultra infinitesimal water particles and negative ions by rotating two spinning cylinder assemblies 6A and 6B which stand side by side. Referring now to FIG. 6, a top plan view of the theoretical operation of the spinning cylinder assemblies 6A and 6B is provided. The spinning cylinder assemblies are shown to be rotating in the same direction, as indicated by arrows B of FIG. 6, within a typhoon case. A mark "x" in FIG. 6 indicates a collision point of water thrown from each spinning cylinder assemblies.

Figure 7:
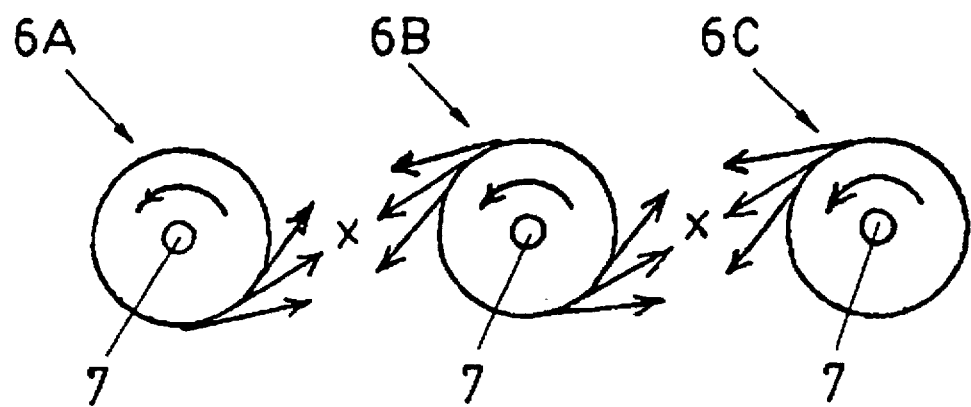

Referring now to FIG. 7, a top plan view of the theoretical operation of an alternative embodiment of the invention which employs three spinning cylinder assemblies 6A, 6B, and 6C arranged in a straight line as shown by FIG. 7. The spinning cylinder assembly 6C is the same construction as for previously described spinning cylinder assemblies 6A and 6B. The additional spinning cylinder assembly provides at least double the collisions points for the water thrown from the spinning cylinder assemblies, as shown by the mark "X" in FIG. 7.

Figure 8:
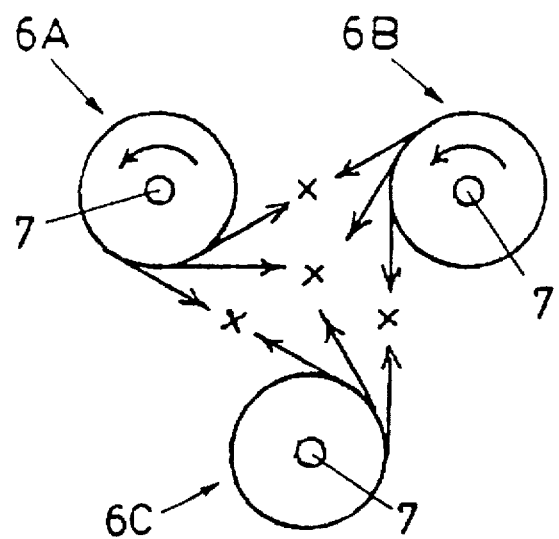

Referring to FIG. 8 of the drawing, three spinning cylinder assemblies 6A, 6B, and 6C can alternatively be arranged in the form of an equilateral triangle. Thus, additional collision points "x" are provided, which includes the spaces between any two of the spinning cylinder assemblies, and also the central space in the middle of the triangular arrangement of the spinning cylinder assemblies 6A, 6B, and 6C. The production of an ultra infinitesimally small water particles and negative ions is increased as the collision region is increased.

Figure 9:
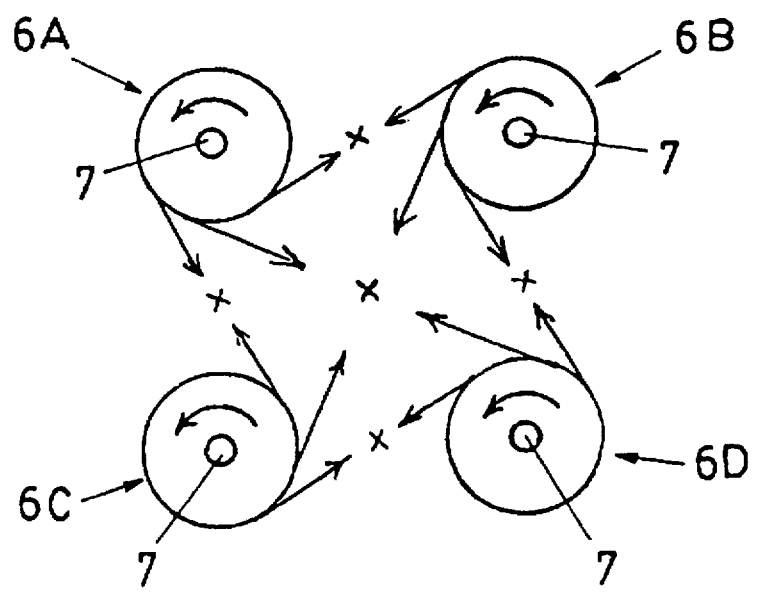

Furthermore, by installing four spinning cylinder assemblies 6A, 6B, 6C, 6D in the formation of a square, as shown by FIG. 9, a collision space of injected water is increased to four spaces among four spinning cylinder assemblies plus the central space of the square arrangement, and production of ultra infinitesimally small water particles and negative ions is again increased substantially.

Figure 10:
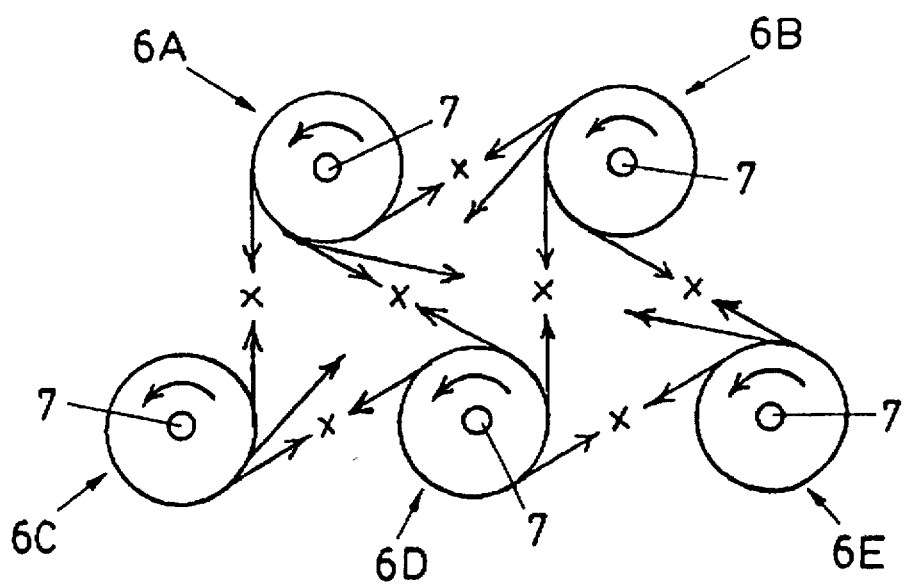
Figure 11:
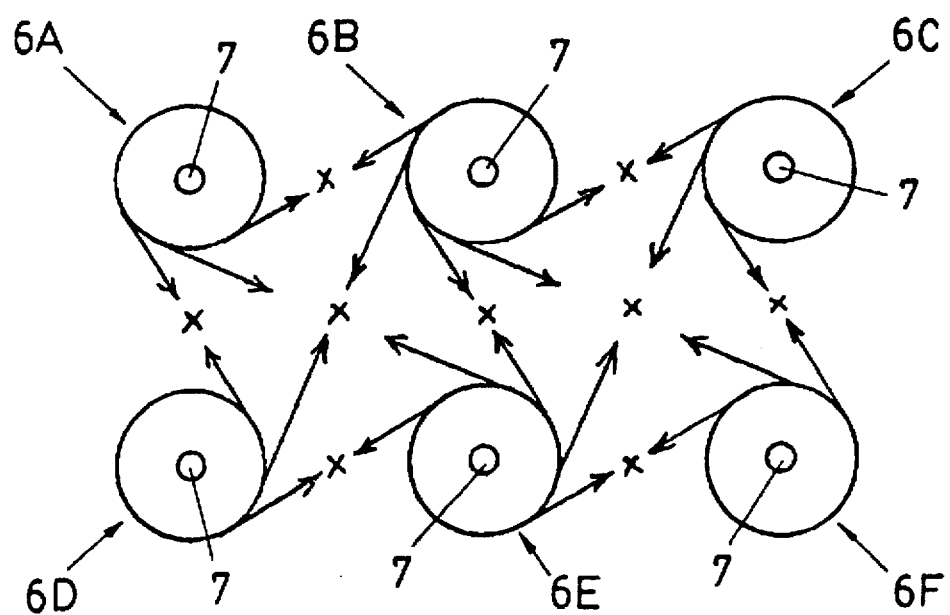

Further, by installation of five spinning cylinder assemblies 6a, 6B, 6C, 6D, 6E, a shown by FIG. 10, and six spinning cylinder assemblies 6A, 6B, 6C, 6D, 6E, 6F, as shown by FIG. 11, a collision space of injected water is increased accordingly and production of an ultra infinitesimal water particle and a negative ion are increased enormously. Each of the spinning cylinder assemblies 6A through 6F have similar construction as previously described in detail.

As described above, the size, the number and the arrangement of a spinning cylinder assemblies standing side by side within a typhoon case can be decided by taking a place of installation and required purification capacity of the air purification apparatus into consideration.

Also, it is to be understood that the particular shape or configuration of the typhoon case 1 or the apparatus as a whole not critical to the practice of the invention, and that any suitable size, shape, or configuration of the air purification apparatus can be employed to meet the air purification requirements of a particular room or building.

Figure 12:
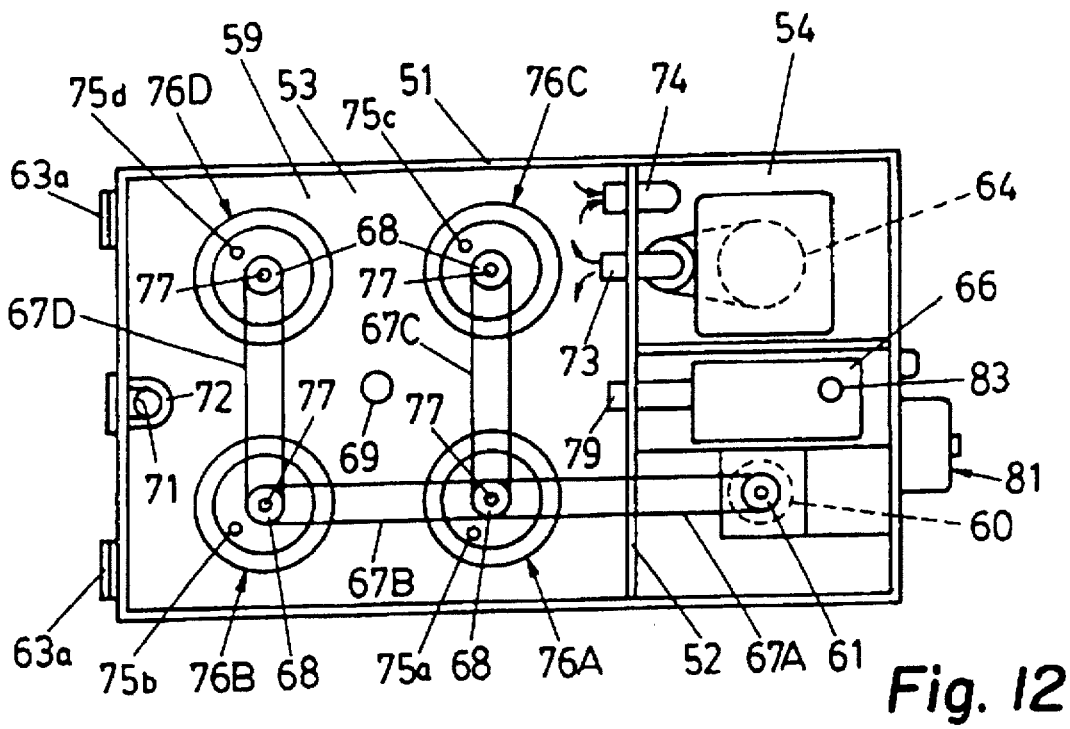
Figure 13:
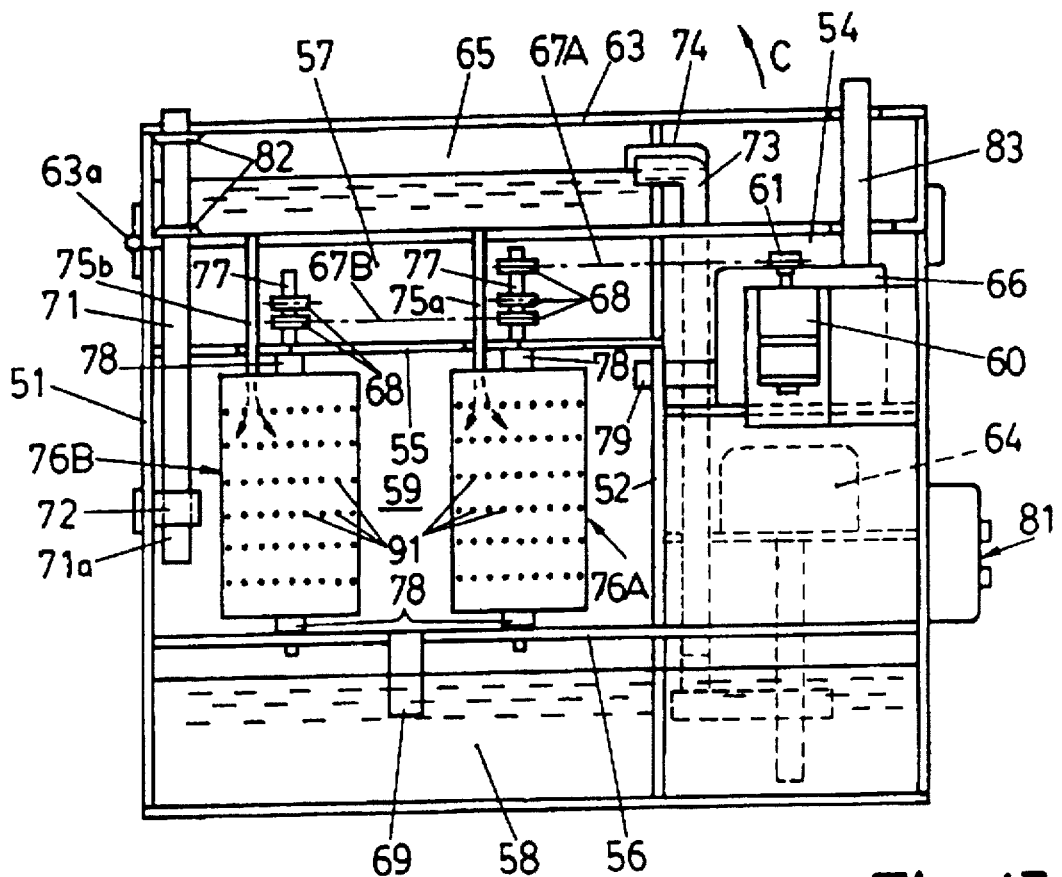
Figure 14:
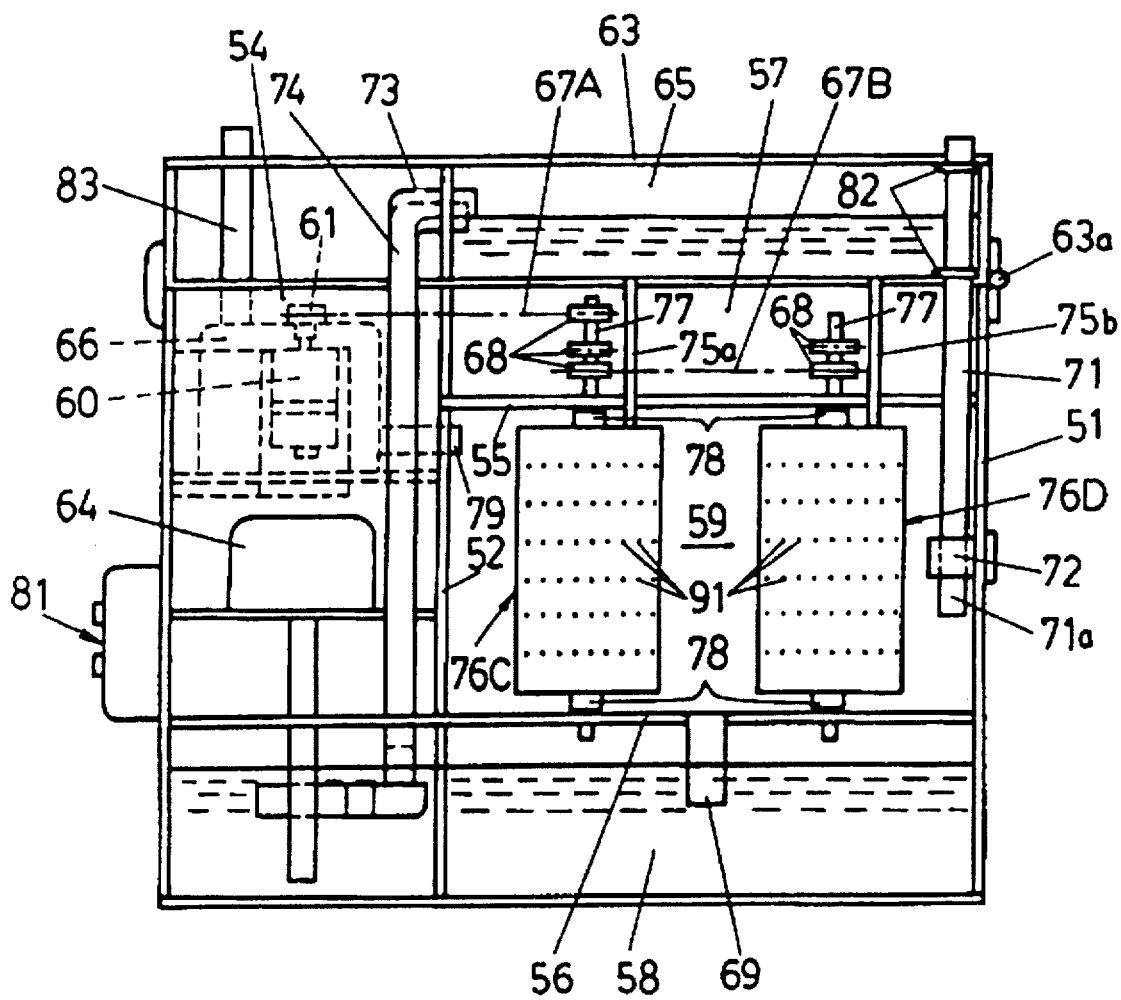

Portable Apparatus—FIGS. 12–14

Hereunder, an operating form of a portable air purification apparatus is described, referring to FIGS. 12 through 14.

This air purification apparatus housing whole component within a portable case 51 is small, light weight, and portable. A portable case 51 being vertically divided to a typhoon chamber 59 and a drive housing 54. The drive housing 54 is further vertically divided to two sections where a water circulation pump 64, an air blower 66, and a motor 60 are installed.

Referring to FIG. 13, the portable case 51 is also divided in cross-section by an upper partition 55 and a lower partition 56, thereby forming a drive power transfer housing 57 above the upper partition 55, a lower water tank 58 under the lower partition 56, and defining the upper and lower walls of the typhoon chamber 59 between said two partitions 55, 56.

Continuing to refer to FIG. 13, an upper water tank 65 is positioned in the top part of the portable case 51, having a top lid 63 that opens and closes to the direction of an arrow C by a hinge 63a.

Within the typhoon chamber 59, four spinning cylinder assemblies 76A–76D stand side by side in a square arrangement and having an equal distance between them as shown by FIG. 12. Each rotation shaft 77 of a spinning cylinder assemblies 76A–76D is supported by a bearing 78 attached to the upper partition 55 and the lower partition 56 as shown by FIGS. 13 and 14. The top portion of each rotation shaft 77 of the spinning cylinder assemblies 76A–76D extends into a driving power transfer housing 57. Three pulleys 68 are fixed to a rotation shaft 77 of a spinning cylinder assemblies 76A, two pulleys 68 are fixed to a rotation shaft 77 of a spinning cylinder assemblies 76B, and one pulley 68 each is fixed to a rotation shaft 77 of a spinning cylinder assemblies 76C and 76D. A belt 67A is stretched between a driving pulley 61 fixed to a motor 60 and a pulley 68 fixed to a rotation shaft 77 of a spinning cylinder assemblies 76A. Each of three belts 67B–67D is stretched between a pulley 68 fixed to four rotation shaft 77 of four spinning cylinder assemblies 76A–76D, as shown by FIG. 12.

A motor 60 turns four spinning cylinder assemblies 76A–76D at high speed simultaneously. The basic construction of a spinning cylinder assemblies 76A–76D and numerous small holes 91 being formed in line on the surface of a spinning cylinder assemblies 76A–76D are same as for the spinning cylinder assemblies 6A and 6B previously described except that the size of the spinning cylinder assemblies 76A–76D is smaller to enhance portability of the apparatus.

A water pipe 75a–75d is installed to the bottom of an upper water tank 65 to supply water to each of the spinning cylinder assemblies 76A–76D within the typhoon chamber 59 and a water drain pipe 69 is attached to the bottom of the typhoon chamber 59 to drain hole water to a lower water tank 58. An air inlet opening pipe 71 which passes through a top lid 63 and a driving power housing 57 to reach the typhoon chamber 59 is held by a holder 72 attached to a portable case 51 utilizing friction and can be pulled out easily.

The top of an air inlet opening pipe 71 is an air inlet opening.

As shown by FIG. 13, a water proof seal 82 is attached to a hold of an upper water tank 65 through which an air inlet opening pipe 71 passes, in order to prevent leakage of water from an upper water tank 65 to a driving power transfer housing 57.

A circulation water pump 64 pumps up water from a lower water tank 58 to an upper water tank 65 through a circulation water supply pipe 73. A water return pipe 74 running from an upper water tank 65 to a lower water tank 58 is installed along side of a circulation water supply pipe 73. In case the water level of the upper water tank 65 becomes higher than an outlet of a water return pipe 74, excess water is returned to a lower water tank 58 through a water return pipe 74.

Purified air from within the typhoon chamber 59 is pulled out by a blower 66 through an air suction pipe 79 and sent out through an air outlet opening pipe 83 which runs through a top lid 63 reaching out of a portable case 51. The top end of an air outlet opening pipe 83 is called a purified air outlet opening. On/off switch 81 is attached to a portable case 51 as shown by FIGS. 12 through 14.

To operate this air purification apparatus a lower water tank 58 to be filled with water from a water supply tap attached to a lower water tank 58 which is not shown in a drawing.

Water may be supplied from an upper water tank 65 to a lower water tank 58 through a circulation water supply pipe 73 but it may take more time. Upon completion of filling water to a lower tank 58 by pushing a switch 81 on, a circulation water pump 64 starts to pump water up from the lower water tank 58 to the upper water tank 65 through the circulation water supply pipe 73.

When a switch 81 is flipped to the on position, the motor 60 also starts to run and the rotational power of a motor 60 is transferred to the four spinning cylinder assemblies 76A–76D through pulley 68 and four belts 67A–67D. Thus, all four spinning cylinder assemblies 76A–76D rotate in the same direction at high speed. Water being supplied from an upper water tank 65 through a water supply pipe 75a–75d to the spinning cylinder assemblies 76A–76D is injected through small holes 91 by the centrifugal force the same way as in the case of the air purification apparatus as shown by FIG. 1. The head on collisions of the water drops produces ultra infinitesimally small water particles and negative ions in abundance. These ultra infinitesimally small water particles and negative ions have high purification power and are delivered to outside of a portable case 51 through the air suction pipe 79 and an air outlet opening pipe 83 by the blower 66.

Thereby, the portable apparatus is capable of delivering ultra infinitesimally small water particles and negative ions having high air purification power to a home, an office, a meeting room, a bus, a train, etc. wherever air purification is needed.

By turning off the switch 81, the water circulation pump 64 and motor 60 are stopped, which ceases the operation of the air purification apparatus. Water in upper water tank 65 is returned to the lower water tank 58 through the water supply pipe 75a–75d, the spinning cylinder assemblies housing 59, and the water drain pipe 69 by gravity when the air purification apparatus stops its operation.

Water in an air purification apparatus is decreased gradually as operation of an apparatus continues and water must be re-supplied periodically. If a lower water tank 58 can hold 2–3 days water consumption, re-supply of water does not interfere with operation. Water can be resupplied direct to a lower water tank 58 or to an upper water tank 65 through a pre-arranged water intake, such as a flexible hose or fill tube.

By pulling out an air inlet opening pipe 71 before opening a top lid 63, a top lid 63 can be opened to the direction shown by an arrow C of FIG. 13, using a hinge 63a as a fulcrum, without hindrance. And a top lid 63 can be opened without hindrance of an air outlet opening pipe 83, by opening an oblong hole of left and right direction on the surface of a top lid 63 to get an air outlet opening pipe 83 to pass through as shown by FIG. 13.

Also a top lid 63 can be opened smoothly, by opening an oblong (slot) hole of left and right direction on an upper partition 55 in order to set free each of a water supply pipe 75a–75d which moves with a top lid 63 as one united body as shown by FIG. 13. (an oblong hole to be covered by a water proof flexible rubber cover)

This invention produces ultra infinitesimal water particles and negative ions with high purification power in abundance and high density. Water drops are forcibly injected through the small holes formed in the walls of a plurality of spinning cylinder assemblies under the centrifugal force created by rotating the spinning cylinder assemblies at high speed. Many of the water drops forcibly injected through the small holes collide head on with each other to form the infinitesimally small water particles and negative ions.

This invention simulates the natural phenomenon of air purification in the atmosphere on the occurrence of typhoon or rain storm within the apparatus. This invention can be made of comparatively simple design and construction in compact size and at economical cost.

The invention does not produce any harmful ozone. Also this air purification apparatus purifies air in a room by delivering ultra infinitesimal water particles and negative ions with high purification power in high density to a room which is totally different from the other type of air purification apparatus which purifies polluted air through a filter and returns purified air to a room. Therefore, although this apparatus can be effectively combined with an air purification filter or filtration system, this apparatus does not need a size-exclusive air purification filter and can save the operations costs of filter inspection, exchange, and maintenance.

The embodiments shown and described above are only exemplary. Many details are often found in the art. Therefore, many such details are neither shown or described. It is not claimed that all the details, parts, elements, and steps described and shown or invented herein are invented herein. Even though numerous characteristics and advantages of the present invention have been set forth in relationship to the inventions of the foregoing description, changes may be made in the detail especially in matters of shape, size, and arrangement of parts wherein the principles of the invention are not changed. The restrictive description and drawings of this specific examples above do not point out what an infringement of this patent would be, but are to provide at least one explanation of how to make and use the invention. The limits of the invention or the bounds of the patent protection are measured by and defined in the appended claims.

What is claimed is:

1. An air purification apparatus comprising:
   (a) a typhoon chamber, said typhoon chamber having at least one water supply line opening at least one drain hole, at least one air inlet opening, and at least one air outlet opening;
   (b) a first spinning cylinder mounted within said typhoon chamber for rotational movement about a central axis of said first spinning cylinder, said first spinning cylinder having at least a cylindrical side wall with a plurality of small holes formed therein;
   (c) a second spinning cylinder mounted within said typhoon chamber for rotational movement about a central axis of said second spinning cylinder, said second spinning cylinder having at least a cylindrical side wall with a plurality of small holes formed therein, and said second spinning cylinder being mounted in parallel alignment to said first spinning cylinder;
   (d) drive means operatively connected to said first and second spinning cylinders for spinning said first and second spinning cylinders;
   (e) water circulation means for delivering water through said at least one water supply line into said typhoon chamber and to the interior of each of said first and second spinning cylinders;
   (f) air circulation means for circulating air through said air inlet opening, through said typhoon chamber, and through said air outlet opening;
   whereby the centrifugal force of the first and second spinning cylinders throws streams of water droplets to the interior of said typhoon chamber between said first and second spinning cylinders such that the water droplets are forced to collide against each other to form infinitesimally small water particles and negative ions, which purify the air circulating through said typhoon chamber and are loaded into the air circulating through said typhoon chamber.

2. An air purification apparatus according to claim 1, wherein said water supply line opening is positioned near an upper portion of said typhoon chamber and said drain hole is positioned toward a lower portion of said typhoon chamber, whereby water circulated through said typhoon chamber substantially falls downward from the upper portion thereof toward the lower portion thereof.

3. An air purification apparatus according to claim 2, wherein said air inlet opening is positioned toward the lower portion of said typhoon chamber and said air outlet opening is positioned toward the upper portion of said typhoon chamber, whereby air circulated through said typhoon chamber substantially moves upward from the lower portion thereof toward the upper portion thereof, which produces an additional counter-current effect between the substantially downwardly falling water and the substantially upwardly moving air that assists in mixing the water and air within the typhoon chamber for loading the air with infinitesimally small water particles and negative ions.

4. An air purification apparatus according to claim 1, wherein said first and second spinning cylinders are mounted within said typhoon chamber such that the central axes of the first and second spinning cylinders are substantially vertical and parallel to one another.

5. An air purification apparatus according to claim 4, wherein said first and second spinning cylinders are both rotated in the same direction.

6. An air purification apparatus according to claim 1, wherein said first and second spinning cylinders each additionally have a bottom wall enclosing the lower end thereof, whereby water is retained within said first and second spinning cylinders so that it can be forced out through said plurality of small holes in said cylindrical side walls by the centrifugal effect of the spinning of the cylindrical side walls of said first and second spinning cylinders.

7. An air purification apparatus according to claim 1, wherein the interiors of the side wall of said first and second spinning cylinders are additionally covered with a substantially cylindrical sponge sheet for absorbing water and maintaining an even distribution of water on the interior of said side walls of said first and second spinning cylinders, whereby water is more evenly dispersed on the interior of said side walls of said first and second spinning cylinders and is more evenly forced through said plurality of small holes of said side walls.

8. An air purification apparatus according to claim 1, additionally comprising: at least a third spinning cylinder mounted within said typhoon chamber for rotational movement about a central axis of said third spinning cylinder.

9. An air purification apparatus according to claim 8, wherein said first, second, and third spinning cylinders are mounted within said typhoon chamber such that the central axes of the first, second, and third spinning cylinders are substantially vertical and parallel to one another.

10. An air purification apparatus according to claim 9, wherein the central axes of said first, second, and third spinning cylinders are arranged in a linear row.

11. An air purification apparatus according to claim 9, wherein the central axes of said first, second, and third spinning cylinders are arranged in a triangle.

12. An air purification apparatus according to claim 1, additionally comprising: at least a third spinning cylinder mounted within said typhoon chamber for rotational movement about a central axis of said third spinning cylinder; and at least a fourth spinning cylinder mounted within said typhoon chamber for rotational movement about a central axis of said fourth spinning cylinder.

13. An air purification apparatus according to claim 12, wherein said first, second, third, and fourth spinning cylinders are mounted within said typhoon chamber such that the central axes of said first, second, third, and fourth spinning cylinders are substantially vertical and parallel to one another.

14. An air purification apparatus according to claim 13, wherein the central axes of said first, second, third, and fourth spinning cylinders are positioned in a square arrangement.

15. An air purification apparatus according to claim 1, wherein said drive means comprises: a motor having a drive shaft, a drive pulley connected to said drive shaft of said motor, a mounting shaft for each of said first and second spinning cylinders, a first and second transfer pulley connected to each of the mounting shafts of said first and second spinning cylinders, respectively, and at least one drive belt connected between said drive pulley and said first and second transfer pulleys for transferring rotational movement of said drive shaft to each of said mounting shafts of said first and second spinning cylinders.

16. An air purification apparatus according to claim 1, wherein said water circulation means comprises: a water tank, a water circulation pump in fluid communication with said water tank, water supply piping for delivering water from said water tank through said at least one water supply line into said typhoon chamber and to the interior of each of said first and second spinning cylinders.

17. An air purification apparatus according to claim 1, wherein said air circulation means comprises: a blower suction duct connected to the air outlet of said typhoon chamber, an air blower having a suction side and a blower side, the suction side of said air blower connected to said blower suction duct, and an air delivery duct connected to the blower side of said air blower for delivering air to any desired location outside of said typhoon chamber, whereby air is drawn through said air inlet opening, through said typhoon chamber, and through said air outlet opening to said remote location.

18. An air purification apparatus comprising:
a typhoon chamber of waterproof structure having a water supply inlet opening, a drain, and air inlet and outlet openings;
a plurality of spinning cylinder assemblies mounted within said typhoon chamber in parallel alignment to each other, and the surface of each of the spinning cylinder assemblies having numerous small holes formed therein;
a motor operatively connected to each of said spinning cylinder assemblies to each of said plurality of spinning cylinder assemblies at high speed;
a water tank;
a water pump operatively connected between said water tank and said spinning cylinder assemblies for pumping water from said water tank to said plurality of spinning cylinder assemblies in said typhoon chamber;
an air blower operatively connected through a duct to at least one of said air inlet and outlet openings of said typhoon chamber for circulating air through said typhoon chamber;
whereby by operating said motor and rotating said plurality of spinning cylinder assemblies at high speed, and by pumping water from said water tank to said plurality of spinning cylinder assemblies, water pumped to the inside of each of the plurality of spinning cylinder assemblies is injected by centrifugal force through said numerous small holes at high speed such that water drops are forced to collide against each other, which produces infinitesimally small water particles and negative ions that have high air purification ability.

19. An air purification apparatus comprising:
a typhoon chamber of waterproof structure having an air inlet opening and an air outlet opening;
a plurality of spinning cylinder assemblies, the surface of each having numerous small holes being formed therein, said spinning cylinder assemblies being supported in parallel alignment to each other;
a driving means for rotating each said plural spinning cylinder assemblies at high speed;
a water pump connected to a water supply source to deliver water to said spinning cylinder assemblies within said typhoon chamber;
an air blower device connected to at least one of said air inlet or said air outlet openings of said typhoon chamber;
whereby water that is supplied to said spinning cylinder assemblies is injected through said numerous small holes at high speeds such that water drops are forced to collide against each other, which produces infinitesimally small water particles and negative ions exhibiting high air purification power, which is delivered to a desired location via said air blower device.

20. An air purification apparatus according to claim 19, wherein said plurality of spinning cylinder assemblies have an inside surface that is covered by spongy absorptive material.

21. An air purification apparatus comprising:

(a) a typhoon chamber, said typhoon chamber having at least one water supply line opening, at least one drain hole, at least one air inlet opening, and at least one air outlet opening, wherein said water supply line opening is positioned near an upper portion of said typhoon chamber and said drain hole is positioned toward a lower portion of said typhoon chamber, whereby water circulated through said typhoon chamber substantially falls downward from the upper portion thereof toward the lower portion thereof, and wherein said air inlet opening is positioned toward the lower portion of said typhoon chamber and said air outlet opening is positioned toward the upper portion of said typhoon chamber, whereby air circulated through said typhoon chamber substantially moves upward from the lower portion thereof toward the upper portion thereof; which produces a counter-current effect between the substantially downwardly falling water and the substantially upwardly moving air that assists in mixing the water and air within said typhoon chamber for loading the air with tiny water particles and negative ions;

(b) a first spinning cylinder mounted within said typhoon chamber for rotational movement about a central axis of said first spinning cylinder, said first spinning cylinder having at least a cylindrical side wall with a plurality of small holes formed therein and the interior of the side wall of said first spinning cylinder is covered with a substantially cylindrical sponge sheet for absorbing water and maintaining an even distribution of water on the interior of the side wall;

(c) a second spinning cylinder mounted within said typhoon chamber for rotational movement about a central axis of said second spinning cylinder, said second spinning cylinder having at least a cylindrical side wall with a plurality of small holes formed therein and the interior of the side wall of said second spinning cylinder is covered with a substantially cylindrical sponge sheet for absorbing water and maintaining an even distribution of water on the interior of the side wall;

(d) a motor having a drive shaft, a drive pulley connected to said drive shaft of said motor, a mounting shaft for each of said first and second spinning cylinders, a first and second transfer pulley connected to each of the mounting shafts of said first and second spinning cylinders, respectively, and at least one drive belt connected between said drive pulley and said first and second transfer pulleys for transferring rotational movement of said drive shaft to each of said mounting shafts of said first and second spinning cylinders;

(e) a water tank, a water circulation pump in fluid communication with said water tank, water supply piping for delivering water from said water tank through said at least one water supply line into said typhoon chamber and to the interior of each of said first and second spinning cylinders;

(f) air circulation means for circulating air through said air inlet opening through said typhoon chamber, and through said air outlet opening;

whereby the centrifugal force of said first and second spinning cylinders throws streams of water droplets to the interior of said typhoon chamber between said first and second spinning cylinders such that the water droplets are forced to collide against each other to form infinitesimally small water particles and negative ions, which purify the air circulating through said typhoon chamber and are loaded into the air circulating through said typhoon chamber.

* * * * *

UNITED STATES PATENT AND TRADEMARK OFFICE
CERTIFICATE OF CORRECTION

PATENT NO. : 5,704,954
DATED : Jan. 6, 1998
INVENTOR(S) : Hideaki Takagi

It is certified that error appears in the above-identified patent and that said Letters Patent is hereby corrected as shown below:

In Column 1, line 67 after "covering" insert the word -- a --;
In Column 3, line 35 the word "if" should be -- of --;
In Column 6, line 31 the word "stretch" should be -- stretched --
In Column 7, line 2 the word "speed" should be -- speeds --;
In Column 7, line 2 the word "motor" should be -- motors --;
In Column 7, line 14 insert the word "the" before -- water --;
In Column 8, line 67 the word "drop" should be -- drops --;
In Column 9, line 9 the word "is" should be -- are --;
In Column 9, line 34 the word "environment" should be -- environmental --;
In Column 9, line 62 insert the word "with" before -- each --;
In Column 9, line 63 delete the first occurrence of the word "the";
In Column 10, line 7 after the word "of" delete the word -- a --;
In Column 10, line 16 the word "particle" should be -- particles --;
In Column 10, line 24 delete the word "an";
In Column 10, line 33 the word "assemblies" should be -- assembly --;
In Column 10, line 51 delete the word "an";
In Column 10, line 62 "6a" should be -- 6A --;
In Column 10, line 65 delete the word "an";
In Column 10, line 66 the word "particle" should be -- particles --;
In Column 10, line 66 the word "ion" should be -- ions --;
In Column 11, line 4 delete the word "a";
In Column 11, line 19, after "housing" insert the words -- is a --;
In Column 11, line 40, delete the word "a";
In Column 11, line 60, after the word "are" insert -- the --;
In Column 12, line 3 delete the word "hole";
In Column 12, line 32 after "58" delete the words "to be" and insert the word -- is --;
In Column 13, line 36, after "of" insert -- a --;
In Column 13, line 63 the word "this" should be -- these --;
In Column 14, line 4 after "opening" insert a -- , --;

UNITED STATES PATENT AND TRADEMARK OFFICE
CERTIFICATE OF CORRECTION

PATENT NO. : 5,704,954
DATED : Jan. 6, 1998
INVENTOR(S) : Hideaki Takagi

It is certified that error appears in the above-identified patent and that said Letters Patent is hereby corrected as shown below:

In Column 17, line 17, after "therefore" delete the ";" and insert a -- , --;

In Column 18, line 23 after "opening" insert a -- , --.

In Column 10, line 62 the word "a" should be -- as --;

In Column 10, line 66 delete the word "a";

In Column 11, line 59, the word "surface" should be -- surfaces --;

In Column 11, line 59, delete the word "a";

Signed and Sealed this

Sixth Day of October, 1998

Attest:

BRUCE LEHMAN

*Attesting Officer*     *Commissioner of Patents and Trademarks*